United States Patent Office 3,048,596
Patented Aug. 7, 1962

3,048,596
3 - CYANO - [1,3] - DITHIOLO - [4,5-c] - ISOTHIAZOLE - $\Delta^{5,a}$ - MALONONITRILE AND PROCESS
William R. Hatchard, Wilmington, Del., assignor to E. I. du Pont de Nemours and Company, Wilmington, Del., a corporation of Delaware
No Drawing. Filed Aug. 31, 1960, Ser. No. 53,038
2 Claims. (Cl. 260—302)

This invention relates to a new heterocyclic compound. More particularly, it relates to a new cyclic cyanocarbon sulfide and to a process for its preparation.

In recent years, considerable scientific and technical interest has developed in cylic cyanocarbon sulfides. These compounds, which have been completely unknown until lately, have a unique structure. They are composed solely of carbon, nitrogen and sulfur; they contain sulfur hetero atoms, and cyano groups attached to unsaturated carbon, which confer upon them a high degree of unsaturation in the form of conjugated systems. Published examples of cyclic cyanocarbon sulfides include tetracyano-1,4-dithiin,

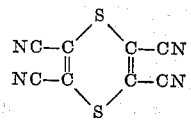

reported by G. Bähr in Angew. Chem. 70, 606 (1958); the 1,2-dicyano-3,5-dithia-1-cyclopentene-4-thione,

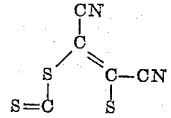

of British Patent 829,529; and a compound of empirical formula $C_8N_4S_3$, disclosed in Australian patent application 48,349/59, where it is assigned the structure

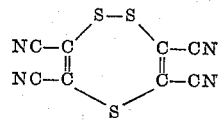

and described as a yellow crystalline material of melting point 181–183° C., useful as a fungicide.

A new and highly useful cyclic cyanocarbon sulfide of formula $C_8N_4S_3$ has now been prepared, which differs markedly from the compound mentioned above. This new cyanocarbon sulfide is a yellow compound having a melting point from 215 to 220° C. It has the structure of an isothiazole derivative, 3-cyano-[1,3]-dithiolo-[4,5-c]-isothiazole-$\Delta^{5,a}$-malononitrile, (I) 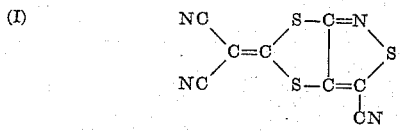

This new compound is prepared by sulfurization of another cyclic cyanocarbon sulfide, 4,5-dicyano-1,3-dithiole-$\Delta^{2,a}$-malononitrile, (II) 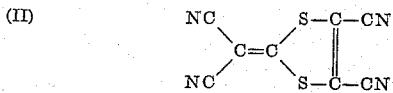

This process is preferably conducted by heating, at a temperature of at least 50° C., 4,5-dicyano-1,3-dithiole-$\Delta^{2,a}$-malononitrile with elemental sulfur in an alcoholic solution containing catalytic amounts of an alkali metal alkoxide.

The starting material in this process, i.e., compound (II) above, is fully described and claimed in the copending United States application of Morton Brown, Serial No. 24,234, filed April 25, 1960, where it is designated by the alternative name 2-dicyanomethylene-4,5-dicyano-1,3-dithiolene. It is prepared by the reaction of 1,2-dichloro-1,2-dicyanoethylene (i.e., dichloromaleonitrile or dichloro-fumaronitrile) with dipotassium (or disodium) 1,1-dimercapto-2,2-dicyanoethylene, in accordance with the equation:

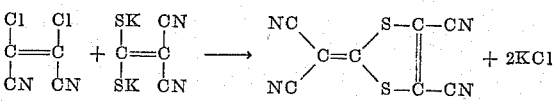

An illustrative preparation is decribed below.

A. DIPOTASSIUM 1,1-DIMERCAPTO-2,2-DICYANOETHYLENE

In a one-liter, three-neck flask fitted with a stirrer, thermometer and dropping funnel was placed a solution of 60 g. of potassium hydroxide in 650 ml. of denatured ethyl alcohol. The solution was cooled to 0° C. and 35.4 g. (0.536 mole) of freshly distilled malononitrile was added all in one portion, followed by the dropwise addition of 41 g. (0.54 mole) of carbon disulfide at 0–10° C. Toward the end of the addition, a canary-yellow salt began to precipitate. After stirring for an hour more at 0–5° C., the solid was collected on a filter and washed with 50 ml. of cold ethyl alcohol. After drying to constant weight at 80° C. and less than 1 mm. pressure, there was obtained 109 g. (94% yield) of dipotassium 1,1-dimercapto-2,2-dicyanoethylene as a yellow, water-soluble solid which did not melt below 250° C.

*Analysis.*—Calcd. for $C_4N_2S_2K_2$: C, 22.01; S, 29.36. Found: C, 21.76; S, 29.23.

B. 4,5-DICYANO-1,3-DITHIOLE-$\Delta^{2,a}$-MALONONITRILE

To a solution of 2.50 g. (0.0115 mole) of dipotassium 1,1-dimercapto-2,2-dicyanoethylene in 50 ml. of methanol was added in one lot 1.47 g. (0.01 mole) of dichloro-fumaronitrile at room temperature. After stirring for 15 minutes, the reaction mixture was poured into 300 ml. of water and the solid which precipitated was collected on a filter (1.12 g.). Recrystallization from hot toluene after treatment with decolorizing carbon yielded 0.99 g. of yellow needles, M.P. 208–209° C. This was shown by elemental and spectral analyses to be 4,5-dicyano-1,3-dithiole-$\Delta^{2,a}$-malononitrile.

*Analysis.*—Calcd. for $C_8N_4S_2$,: C. 44.43; S. 29.64. Found: C, 43.97; S. 30.01.

Further recrystallization from toluene gave a product of somewhat higher melting point (212-214° C.).

In the reaction of this cyanosulfide with sulfur to produce the $C_8N_4S_3$ compound of this invention, the relative proportions of the two reactants are not critical, but it is preferred to use at least one gram atom of sulfur per mole of cyanonsulfide in order to insure complete utilization of the latter. The sulfur is desirably used in slight to moderate excess, e.g., in 5–50% molar excess.

Any alkali metal alkoxide can be used as the catalyst in this reaction, the preferred ones being, of course, those most readily accessible, which are the sodium or potassium alkoxides of alkanols of 1-4 carbon atoms, and most preferably sodium or potassium methoxide or ethoxide. Catalytic amounts of the alkali metal alkoxide are sufficient, e.g., amounts between about 0.005 and 0.1 mole per mole of cyanosulfide. In fact, it is recommended to use amounts of alkali metal alkoxide not appreciably exceeding 0.2 mole per mole of cyanosulfide starting material, since the latter is rather unstable under alkaline conditions and the yield of $C_8N_4S_3$ product decreases when larger amounts of the alkaline catalyst are used.

The process is conveniently conducted by making a solution of sulfur in a substantially anhydrous alcoholic reaction medium, preferably a 1–4 carbon alkanol, especially ethyl alcohol. The catalyst may be prepared separately but it is more expedient to make it in situ by dissolving the desired amount of alkali metal in the alcoholic reaction medium. A particularly convenient way of handling sodium for this purpose is to use it in the form of sodium hydride, which is available commercially as an easily weighable, free-flowing emulsion in mineral oil.

If desired, although this is by no means necessary, a cosolvent can be added to the alcoholic reaction medium to increase the solubility of the reactants and reaction product therein. Examples of suitable cosolvents are acylic or cyclic ethers such as 1,2-dimethoxyethane, dioxane or tetrahydrofuran.

The reaction proceeds at a practical rate at temperatures above about 50° C. It is unnecessary, though not detrimental, to exceed about 150° C., the most useful temperature range being that between 60 and 100° C. The reaction can be carried out at atmospheric pressure or in closed vessels. It is normally essentially completed within a short time, e.g., 10–60 minutes at reaction temperature. The resulting product is isolated by any convenient method, such as crystallization from the reaction mixture, if desired after addition of a nonsolvent or poor solvent.

The infrared and ultraviolet spectral characteristics of the cyanosulfide of this invention, which are given below in detail and serve to identify it, are consistent with the assigned structure, i.e., that of 3-cyano-[1,3]-dithiolo-[4,5-c]-isothiazole-$\Delta^{5,\alpha}$-malononitrile.

The following examples illustrate the invention.

Example I

A mixture of 0.40 g. (0.0125 gram atom) of sublimed sulfur and 0.043 g. of a 55% mineral oil emulsion of sodium hydride (0.001 gram atom of sodium) in 30 ml. of absolute ethanol was heated to boiling until essentially all of the sulfur had dissolved. To this refluxing solution (about 80° C.) was added over a period of about 10 minutes a boiling slurry of 2.16 g. (0.01 mole) of 4,5-dicyano-1,3-dithiole-$\Delta^{2,\alpha}$-malononitrile in 25 ml. of absolute ethanol. On first addition, the color of the reaction mixture changed from yellowish brown to orange. After completion of the addition, the mixture was refluxed for 15 minutes, during which time a solid precipitated. The mixture was filtered hot to give a first crop of greenish yellow crystals (1.11 g.), M.P. 216.5–218° C. On cooling the filtrate, another crop was obtained (0.25 g.), M.P. 215–216.5° C. The filtrate was then evaporated, the residue was triturated with a little methanol and this mixture was filtered to give a third crop (0.12 g.) of the same material. The total yield of 3-cyano-[1,3]-dithiolo-[4,5-c]-isothiazole-$\Delta^{5,\alpha}$-malononitrile was 60% of the theory.

The infrared and ultraviolet absorption spectra of this product (first crop) were identical in all respects with those of a sample obtained in another preparation (see Example III) which was found by elemental analysis to have the composition $C_8N_4S_3$. The characteristic absorption bands are listed below, together with the molar extinction coefficients ($\epsilon$) for the ultraviolet absorption bands.

Infrared: 4,5$\mu$ (strong), 6.7$\mu$ (strong), 6.75$\mu$ (strong), 7.73$\mu$ (strong), 8.7$\mu$, 10.1$\mu$, 10.3$\mu$, 10.85$\mu$, 11.4$\mu$, 11.9$\mu$ and 12.4$\mu$ (strong).

Ultraviolet: ($\lambda$ max. in $CH_2Cl_2$): 282 m$\mu$ ($\epsilon$=6830), 355 m$\mu$ ($\epsilon$=30,700), and 368 m$\mu$ ($\epsilon$=35,200).

Example II

A solution of 1.08 g. (0.005 mole) of 4,5-dicyano-1,3-dithiole-$\Delta^{2,\alpha}$-malononitrile in a mixture of 10 ml. of absolute ethanol and 15 ml. of tetrahydrofuran was added to a boiling solution (about 80° C.) of 0.24 g. (0.0075 gram atom) of sulfur in a mixture of 10 ml. of absolute ethanol and 15 ml. of tetrahydrofuran, to which had been added 0.02 g. of a 55% sodium hydride emulsion in mineral oil. The reaction mixture was boiled 15 minutes, diluted with 50 ml. of ethanol and cooled in an ice bath. The fine yellow needles that formed were collected and dried in air. There was obtained 1.20 g. (100% yield) of 3-cyano-[1,3]-dithiolo-[4,5-c]-isothiazole-$\Delta^{5,\alpha}$-malononitrile, M.P. 215–218° C. The infrared absorption spectrum showed this product to be identical with that of Examples I and III.

Example III

The cyclic cyanotrisulfide of this invention can also be obtained as a by-product in the preparation of the starting material, i.e., the cyanodisulfide, 4,5-dicyano-1,3-dithiole-$\Delta^{2,\alpha}$-malononitrile, when this preparation is carried out under certain conditions. As has already been mentioned, the cyanodisulfide is somewhat unstable in the presence of alkali metal cations. When, in the reaction of 1,2-dichloro-1,2-dicyanoethylene with disodium (or dipotassium) 1,1-dimercapto-2,2-dicyanoethylene, the reactants are allowed to remain in contact for periods exceeding a few hours, e.g., overnight, the reaction product is found to contain appreciable amounts of the cyanotrisulfide $C_8N_4S_3$ in admixture with the cyanodisulfide $C_8N_4S_2$. The two products can be separated by fractional crystallization and/or mechanical separation of their crystal forms. This method, which is described below, offers however no advantages over that of Examples I and II.

Dichlorofumaronitrile (49.5 g., 0.336 mole) was added in one portion to a suspension of 94 g. (0.43 mole) of dipotassium 1,1-dimercapto-2,2-dicyanoethylene in 500 ml. of tetrahydrofuran at 0° C. The reaction mixture was stirred for about 16 hours at room temperature and filtered. Evaporation of the filtrate under reduced pressure left a gummy black residue which was extracted with four 200-ml. portions of boiling toluene. The combined extracts were treated with decolorizing carbon and concentrated to 100 ml. On cooling, there was obtained 36 g. of bright yellow crystals of crude 4,5-dicyano-1,3-dithiole-$\Delta^{2,\alpha}$-malononitrile, M.P. 161–170° C. with decomposition.

A 7.5 g. sample of this crude product was recrystallized from hot toluene to give 6.5 g. of a yellow solid, M.P. 172–200° C. The mother liquors were allowed to stand at room temperature for two months when it was observed that two large crystal conglomerates of different form had been deposited: (A), long, yellow rectangular rods, M.P. 212–212.5° C., and (B), compact yellow-orange rosette, M.P. 219–220.5° C. Elemental analysis and absorption spectra showed that compound (A) was 4,5-dicyano-1,3-dithiole-$\Delta^{2,\alpha}$-malononitrile. Compound (B) was shown to be a trisulfide by elemental analysis.

*Analysis.*—Calcd. for $C_8N_4S_3$: C, 38.8; N, 21.7; S, 38.7. Found: C, 39.3; N, 21.4; S, 38.6.

The infrared and ultraviolet absorption spectra of this compound were identical in all respects to those of the products of Examples I and II, thus establishing the fact that the products of all three examples were identical.

3 - cyano-[1,3]-dithiolo-[4,5-c]-isothiazole-$\Delta^{5,\alpha}$-malononitrile is highly useful as an ultraviolet light absorber for the protection of light-sensitive materials from the harmful rays of sunshine. Thus, in accelerated (Fade-O-Meter) tests, a 1.5 mil thick film of cellulose acetate containing 5% by weight of this cyanotrisulfide was used as a shield over a portion of a swatch of polyethylene terephthalate fabric dyed with a bright fluorescent red dye. It was immediately apparent that the film absorbed the ultraviolet light very effectively, as the U.V.-induced fluorescence of the red fabric underneath was diminished greatly. After 100 hours' exposure to the ultraviolet light of the Fade-O-Meter, there was essentially no diminution in the ability of the film to absorb the light and there was little, if any, fading of the dyed fabric below the film. In contrast, the unshielded portion of the fabric was very badly faded. Other light-sensitive materials which can be protected in this manner include films or fibers of regenerated cellulose, cellulose acetate, polyvinyl chloride, etc. Light filters containing 3-cyano-[1,3]-dithiolo-[4,5-c]-isothiazole-$\Delta^{5,\alpha}$-malononitrile are also useful in photography, optical instruments, welders' eyeshields, wrapping materials for food products and other similar applications.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A process which comprises heating at a temperature of at least 50° C. 4,5-dicyano-1,3-dithiole-$\Delta^{2,\alpha}$-malononitrile with elemental sulfur in an alcoholic solution containing from about 0.005 to 0.2 mole of an alkali metal alkoxide per mole of said malononitrile.

2. The compound 3-cyano-[1,3]-dithiolo-[4,5-c]-isothiazole-$\Delta^{5,\alpha}$-malononitrile, said compound being of the formula

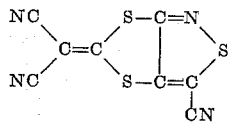

References Cited in the file of this patent

UNITED STATES PATENTS 3,000,780    Van Schoor et al. _____ Sept. 19, 1961